United States Patent
Mastenbrook et al.

(10) Patent No.: US 11,265,152 B2
(45) Date of Patent: Mar. 1, 2022

(54) ENROLMENT OF PRE-AUTHORIZED DEVICE

(71) Applicant: Western Digital Technologies, Inc., San Jose, CA (US)

(72) Inventors: Brian Edward Mastenbrook, Fremont, CA (US); David Robert Arnold, Toronto (CA)

(73) Assignee: Western Digital Technologies, Inc., San Jose, CA (US)

(*) Notice: Subject to any disclaimer, the term of this patent is extended or adjusted under 35 U.S.C. 154(b) by 99 days.

(21) Appl. No.: 16/739,066

(22) Filed: Jan. 9, 2020

(65) Prior Publication Data
US 2021/0218558 A1 Jul. 15, 2021

(51) Int. Cl.
H04L 9/08 (2006.01)
H04L 9/14 (2006.01)
H04L 9/32 (2006.01)

(52) U.S. Cl.
CPC .......... *H04L 9/0825* (2013.01); *H04L 9/0866* (2013.01); *H04L 9/0894* (2013.01); *H04L 9/14* (2013.01); *H04L 9/3263* (2013.01)

(58) Field of Classification Search
CPC ... H04L 9/0825; H04L 9/3263; H04L 9/0866; H04L 9/14; H04L 9/0894
See application file for complete search history.

(56) References Cited

U.S. PATENT DOCUMENTS 5,978,475 A   11/1999  Schneier et al.
6,131,090 A   10/2000  Basso, Jr. et al.
9,286,493 B2   3/2016  Johnson et al.
9,455,963 B1*  9/2016  Roth .................... H04L 63/0464
9,690,916 B2   6/2017  Lin
9,813,416 B2  11/2017  Bolotin et al.
9,881,301 B2   1/2018  Rajkumar et al.
(Continued)

FOREIGN PATENT DOCUMENTS

EP   2877955 B1 *  5/2019  .......... H04L 9/3226
WO   2019/061001    4/2019

OTHER PUBLICATIONS

Mccallum, Nathaniel, et al., latchset / Tang, GitHub Post, Aug. 10, 2018, v7, p. 1-8, https://github.com/latchset/tang#recovery.
(Continued)

*Primary Examiner* — Jeffrey C Pwu
*Assistant Examiner* — Mayasa A. Shaawat
(74) *Attorney, Agent, or Firm* — Patent Law Works LLP

(57) ABSTRACT

Disclosed herein is a data storage device. A data port transmits data between a host computer system and the data storage device. A non-volatile storage medium stores encrypted user content data and a cryptography engine connected between the data port and the storage medium uses a cryptographic key to decrypt the encrypted user content data. The access controller receives from a manager device a public key. The public key is associated with a private key stored on a device to be authorized. The controller determines a user key that provides access to the cryptographic key; encrypts the user key based on the public key and such that the user key is decryptable based on the private key stored on the device to be authorized; and stores, on the data store, authorization data indicative of the encrypted user key.

20 Claims, 5 Drawing Sheets

(56) References Cited

U.S. PATENT DOCUMENTS

| | | |
|---|---|---|
| 10,083,130 B2 | 9/2018 | Bolotin et al. |
| 10,146,706 B2 | 12/2018 | Bolotin et al. |
| 10,154,020 B1 | 12/2018 | Bolotin et al. |
| 10,181,055 B2 | 1/2019 | Bolotin et al. |
| 10,204,240 B2 | 2/2019 | Johnson et al. |
| 10,313,874 B2 | 6/2019 | Amundsen et al. |
| 10,965,474 B1 | 3/2021 | Benson et al. |
| 2002/0023213 A1 | 2/2002 | Walker et al. |
| 2002/0073309 A1 | 6/2002 | Kurn et al. |
| 2004/0054901 A1 | 3/2004 | England et al. |
| 2004/0172538 A1 | 9/2004 | Satoh et al. |
| 2004/0190722 A1 | 9/2004 | Grobman |
| 2005/0114686 A1 | 5/2005 | Ball et al. |
| 2005/0210247 A1 | 9/2005 | Ong et al. |
| 2007/0300052 A1 | 12/2007 | Jevans |
| 2008/0065882 A1 | 3/2008 | Goodman et al. |
| 2008/0219449 A1* | 9/2008 | Ball .................. G06F 21/80 380/277 |
| 2009/0034733 A1 | 2/2009 | Raman et al. |
| 2009/0138727 A1 | 5/2009 | Campello de Souza |
| 2009/0296926 A1 | 12/2009 | Perlman |
| 2010/0088527 A1 | 4/2010 | Johnson et al. |
| 2010/0122327 A1 | 5/2010 | Linecker et al. |
| 2010/0174913 A1 | 7/2010 | Johnson et al. |
| 2012/0210130 A1 | 8/2012 | Buer et al. |
| 2014/0003608 A1 | 1/2014 | MacMillan et al. |
| 2014/0258730 A1 | 9/2014 | Stecher |
| 2016/0149711 A1 | 5/2016 | Fitzgerald |
| 2016/0269367 A1* | 9/2016 | Cocotis .............. H04L 67/1097 |
| 2017/0032148 A1 | 2/2017 | Sofia et al. |
| 2017/0075824 A1* | 3/2017 | Haen .................. G06F 3/0661 |
| 2017/0091463 A1 | 3/2017 | Lindteigen et al. |
| 2017/0213045 A1 | 7/2017 | Garcia et al. |
| 2017/0288867 A1* | 10/2017 | Collier .................. G06F 21/31 |
| 2017/0293766 A1* | 10/2017 | Schnjakin ............ G06F 21/335 |
| 2017/0357822 A1 | 12/2017 | Wei et al. |
| 2018/0062863 A1 | 3/2018 | Baskaran et al. |
| 2018/0167208 A1 | 6/2018 | Le Saint et al. |
| 2018/0183777 A1 | 6/2018 | Guillory et al. |
| 2018/0307869 A1 | 10/2018 | Bolotin et al. |
| 2018/0323970 A1 | 11/2018 | Maron et al. |
| 2018/0357406 A1 | 12/2018 | Bolotin et al. |
| 2019/0007203 A1 | 1/2019 | Bolotin et al. |
| 2019/0036917 A1 | 1/2019 | Sun |
| 2019/0245688 A1 | 8/2019 | Patin et al. |
| 2019/0303603 A1 | 10/2019 | Courtney et al. |
| 2019/0305949 A1 | 10/2019 | Hamel et al. |
| 2020/0007332 A1 | 1/2020 | Girkar et al. |
| 2020/0320622 A1 | 10/2020 | Meier et al. |
| 2020/0403786 A1 | 12/2020 | de Matos |
| 2021/0152372 A1 | 5/2021 | Hunt et al. |

OTHER PUBLICATIONS

Red Hat Enterprise Linux 8, Security hardening, Products & Services pamphlet, Chapter 9, Configuring automated unlocking of encrypted volumes using policy-based decryption, Red Hat Products & Services Webpage, 2020, p. 64-82, https://access.redhat.com/documentation/en-us/red_hat_enterprise_linux/8/html/security_hardening/configuring-automated-unlocking-of-encrypted-volumes-using-policy-based-decryption_security-hardening.

Scherf, Thorsten, Automatic data encryption and decryption with Clevis and Tang, Passing Secrets, Admin Network & Security, Online Magazine Article, 2018, p. 1-6, Issue 43, https://www.admin-magazine.com/Archive/2018/43/Automatic-data-encryption-and-decryption-with-Clevis-and-Tang.

Tweedale, Fraser, Introduction to Tang and Clevis, Fraser's IdM Blog, Feb. 11, 2016. p. 1-5, https://frasertweedale.github.io/blog-redhat/posts/2016-02-11-tang-tls.html.

Athow, Desire, "SecureData SecureDrive BT 1TB review" Retrieved online, URL: <https://www.techradar.com/reviews/securedata-securedrive-bt-1tb>, accessed on Oct. 24, 2019.

Smith, Lyle, "SecureData SecureDrive BT External Drive Review" Retrieved online, URL: <https://storagereview.com/securedata_securedrive_bt_external_drive_review>, accessed on Oct. 24, 2019.

Van Allen, Fox, "How to Unlock Your Computer Automatically With Your Phone" Retrieved online, URL: <https://www.techlicious.com/tip/computer-proximity-locks-for-mac-pc-chromebook/>, accessed on Oct. 24, 2019.

"DataLock BT Remote Management", Retrieved online, URL: <https://www.clevx.com/datalock-bluetooth-encrypted-security/>, accessed on Oct. 24, 2019.

International Search Report and Written Opinion of Application No. PCT/US2020/039216, dated Nov. 22, 2020 (8 pages).

International Search Report and Written Opinion for International Application No. PCT/US2020/039212, dated Oct. 12, 2020, 9 pgs.

International Search Report and Written Opinion for International Application No. PCT/US2020/039214, dated Sep. 17, 2020, 7 pgs.

International Search Report and Written Opinion for International Application No. PCT/US2020/039215, dated Sep. 14, 2020, 10 pgs.

International Search Report and Written Opinion for International Application No. PCT/US2020/039217, dated Oct. 19, 2020, 11 pgs.

International Search Report and Written Opinion for International Application No. PCT/US2020/039219, dated Oct. 1, 2020, 8 pgs.

International Search Report and Written Opinion for International Application No. PCT/US2020/039714, dated Sep. 24, 2020, 9 pgs.

International Search Report and Written Opinion for International Application No. PCT/US2020/039715, dated Oct. 12, 2020, 10 pgs.

* cited by examiner

ENROLMENT OF PRE-AUTHORIZED DEVICE

TECHNICAL FIELD

This disclosure relates to a data storage device that can be locked and unlocked.

BACKGROUND

Encryption of data enables relatively secure storage on data storage devices, such as block data storage devices connectable via a Universal Serial Bus (USB) cable. However, the user experience is often disappointing because the setup of passwords, keys and the like is cumbersome and complicated for technically unskilled users. If encryption is used, the keys and passwords are too often stored insecurely. As a result, many users leave existing encryption technology effectively unused resulting in exposed confidential data.

SUMMARY

This disclosure relates to a data storage device, such as, but not limited to, a block data storage device connectable to a host computer system via a USB cable, so that the data storage device registers as a mass data storage device with the operating system of the host computer system. The data storage device is locked so that the host computer system cannot access data stored on the data storage device. However, a user can unlock the data storage device by using an authorized device that is set up to unlock the data storage device. Further, this disclosure relates to a mechanism by which a manager (with the use of a manager device) can pre-authorize a user device with the data storage device. In response to the pre-authorized user device connecting to the data storage device, the data storage device creates authorization data that enables the pre-authorized device to unlock the data storage device and decrypt encrypted user content data.

Disclosed herein is a data storage device comprising a data path, an access controller and a non-volatile data store. The data path comprises a data port configured to transmit data between a host computer system and the data storage device; a non-volatile storage medium configured to store encrypted user content data; a cryptography engine connected between the data port and the storage medium and configured to use a cryptographic key to decrypt the encrypted user content data stored on the storage medium in response to a request from the host computer system. The access controller is configured to receive from a manager device a public key, wherein the public key is associated with a private key stored on a device to be authorized; determine a user key that provides access to the cryptographic key; encrypt the user key based on the public key and such that the user key is decryptable based on the private key stored on the device to be authorized; and store, on the data store, authorization data indicative of the encrypted user key.

In some embodiments, receiving the public key, determining the user key, encrypting the user key and storing the authorization data is performed in response to the manager device connecting to the data storage device.

In some embodiments, the manager device connecting to the data storage device comprises recovering a manager key that enables determining the user key.

In some embodiments, the manager device is registered with the data storage device based on authorization data, stored on the data store and indicative of the manager key accessible based on a private key stored on the manager device.

In some embodiments, the access controller is configured to, in response to the device to be authorized connecting, perform the steps of determine a challenge for the device to be authorized based on the authorization data; send the challenge to the device to be authorized; receive a response calculated based on the private key stored on the device to be authorized; encrypt at least part of the authorization data using a metadata wrapping key; and providing the metadata wrapping key to the device to be authorized.

In some embodiments, the challenge is based on authorization data accessible using the public key.

In some embodiments, the authorization data accessible using the public key is encrypted based on the public key and a private key stored in the data store.

In some embodiments, the authorization data comprises an index based on the public key for locating the authorization data for the device to be authorized.

In some embodiments, the access controller is configured to replace the index with random data in response to sending the index to the authorization data to the device be authorized.

In some embodiments, the access controller is configured to issue a certificate and send the certificate to the device to be authorized.

In some embodiments, the certificate comprises a metadata wrapping key to encrypt authorization data used to create a challenge.

In some embodiments, the authorization data for each of the multiple authorized devices indicates a transport public key for transporting data between the access controller and that authorized device; and an unlocking public key for generating the challenge for that authorized device.

In some embodiments, the authorization data indicates a first public key and a second public key; and the access controller is configured to selectively update the authorization data based on the first public key being identical to the second public key.

In some embodiments, the cryptographic key is encrypted using an unlocking secret that is specific to each of the multiple authorized devices.

In some embodiments, the access controller is configured to calculate the unlocking secret based on a response from one of the multiple authorized devices to a challenge generated based on the public key associated with the one of the multiple authorized devices.

In some embodiments, the authorization data comprises authorized device metadata encrypted by a pre-authorized metadata wrapping key that is derivable from the public key.

In some embodiments, the pre-authorized metadata wrapping key is derivable from the public key via a key derivation function using a private key stored in the data store.

In some embodiments, the metadata wrapping key is a symmetric key.

Further disclosed herein is a method for enrolling a user device with respect to a data storage device. The method comprises receiving from a manager device a public key, wherein the public key is associated with a private key stored on a user device to be authorized; determining a user key that provides access to the cryptographic key; encrypting the user key based on the public key and such that the user key is decryptable based on the private key stored on the device to be authorized; and storing, on the data store, authorization data indicative of the encrypted user key.

Further disclosed herein is a data storage device comprising means for receiving from a manager device a public key, wherein the public key is associated with a private key stored on a user device to be authorized; means for determining a user key that provides access to the cryptographic key; means for encrypting the user key based on the public key and such that the user key is decryptable based on the private key stored on the device to be authorized; and means for storing, on the data store, authorization data indicative of the encrypted user key.

BRIEF DESCRIPTION OF DRAWINGS

A non-limiting example will now be described with reference to the following drawings.

DESCRIPTION OF EMBODIMENTS

Figure 1:
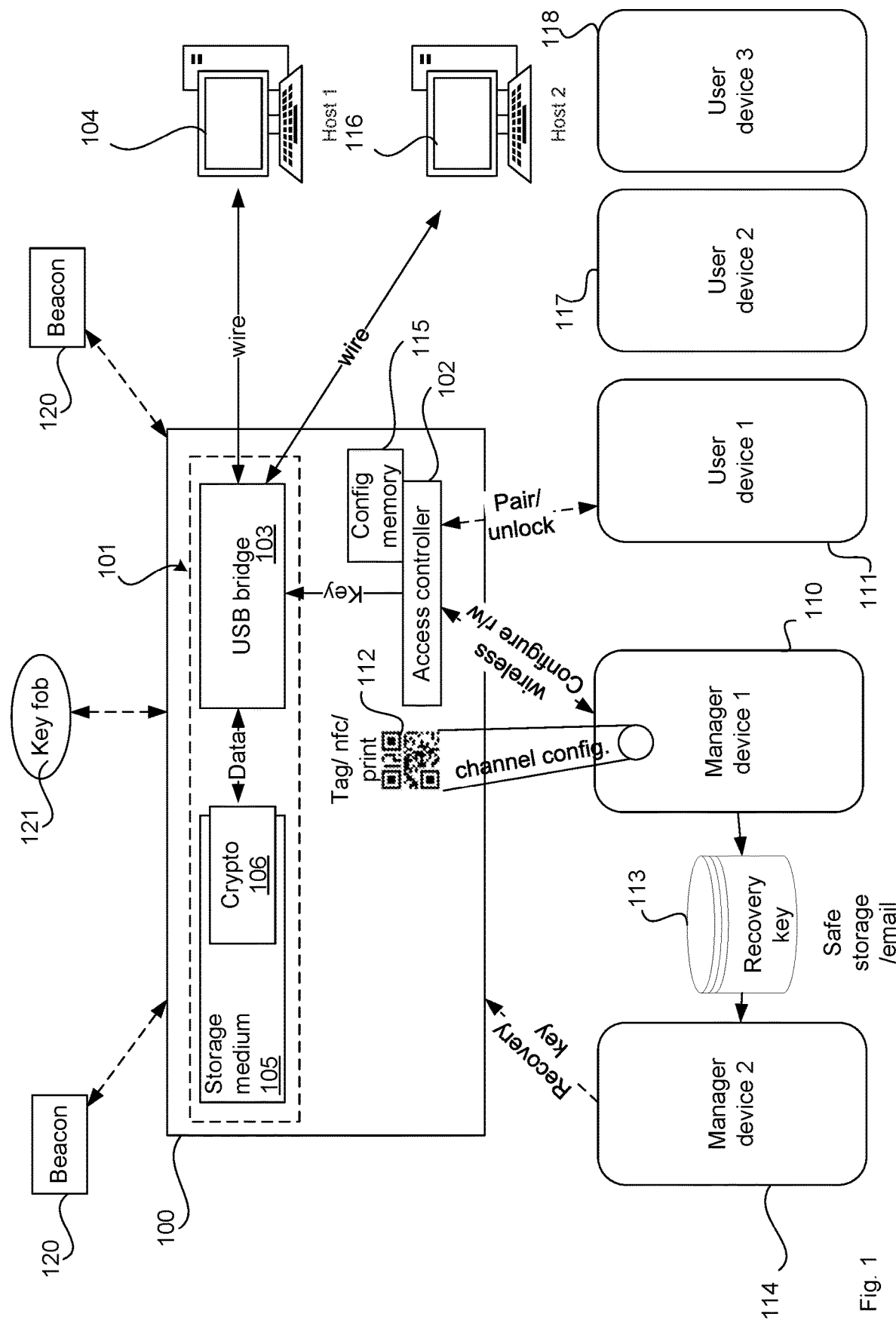
FIG. 1 illustrates a data storage device, according to an embodiment.

FIG. 1 illustrates a data storage device (DSD) 100 comprising a data path 101 and an access controller 102, according to an embodiment. The data path 101 comprises a wire-based data port 103, which is provided in FIG. 1 by a USB bridge, for transmission of data between a host computer system 104 and the DSD 100. In other embodiments, the data path 101 comprises a wireless data port (not shown) for wireless transmission of data between the host computer system 104 and the DSD 100. The DSD 100 registers with the host computer system 104 as a mass data storage device providing the functionality to the operating system of the host computer system 104 of a block data storage device. DSD 100 further comprises a non-transitory storage medium 105 to store encrypted user content data, noting that the user content data is the data that a user would typically want to store on a DSD, such as files including image files, documents, video files, etc. The storage medium may be a solid state drive (SSD), hard disk drive (HDD) with a rotating magnetic disk or other non-volatile storage media. Further, the storage medium may be a block data storage device, which means that the user content data is written in blocks to the storage medium 105 and read in blocks from the storage medium 105.

Command Set

In one example, storage medium 105 comprises a cryptography engine 106 in the form of a dedicated and/or programmable integrated circuit that encrypts data to be stored on storage medium 105 and decrypts data to be read from storage medium 105. In such examples, the storage medium may provide a Small Computer System Interface (SCSI) or Advanced Technology Attachment (ATA) command set according to the Opal specification by the Trusted Computing Group (TCG).

Program code stored on the cryptography engine 106 enables the cryptography engine 106 to receive, interpret and execute commands received from host computer system 104. For example, cryptography engine 106 may be configured to implement the standard ATA or serial ATA (SATA) and/or ATA Packet Interface (ATAPI) command set, which is available from Technical Committee T13 noting that identical functionalities can be implemented within TCG Opal, SCSI and other proprietary architectures. The command set comprises a READ SECTORS command with a command input of the count of sectors and the starting sector (noting that "sector" is used synonymously with "block" herein). Accordingly, there is a corresponding write command. It is noted that there is a data storage device driver installed on host computer system 104. The data storage device driver (not shown) uses the command set to provide high-level services to the operating system, such as file read functionalities. In some examples, the data storage device driver is a generic driver supplied as part of the operating system without support for device-specific encryption commands since the encryption functionality is hidden from the host computer system 104 and handled internally within DSD 100 as described below. This means that no additional drivers need to be installed to use the full functionality disclosed herein.

The command set provided by the cryptography engine 106 to the data port 103 (but not forwarded to host computer system 104) may include a command set from the ATA SECURITY feature set. In particular, the command set may include the command SECURITY SET PASSWORD or a corresponding command from TCG Opal to set a password for reading and writing user content data to the storage medium 105.

In this sense, cryptography engine 106 is connected between the data port 103 and the storage medium 105 and is configured to use a cryptographic key to encrypt user content data to be stored on the storage medium 105 and to decrypt the encrypted user content data stored on the storage medium 105 in response to a request from the host computer system 104. In some examples, the ATA SECURITY feature set is used only by data port 103 and not by host 104. That is, the access controller 102 provides the necessary input for the data port 103 to issue the ATA SECURITY commands to the cryptography engine 106. For example, the access controller 102 may provide a key to the data port 103, which the data port 103 then forwards to the cryptography engine 106 via the SECURITY SET PASSWORD command. The interface between the access controller 102 and the data port 103 may be an Inter-Integrated Circuit (I2C) bus, which is particularly useful in cases where this bus is already implemented in existing chips. However, it is possible to use many other communication architectures including bus, point-to-point, serial, parallel, memory based and other architectures.

Note that the separation of functionalities in dedicated chips as shown in FIG. 1 is only one possible example implementation. Therefore, it is possible to combine functionalities or split the functionalities further. For example, data port 103 may be integrated with access controller 102 into a single chip with a single core. In other cases, the data port 103 and the access controller 102 can be integrated with cryptography engine 106 into a single dedicated chip with a single core. Of course, all chips may have multiple cores.

In one example, the following components are used:

Data port 103: USB 3.1 Gen 2 10 gigabits per second (Gb/s) interface

Access controller 102: nRF52840 system-on-chip (SoC) from Nordic Semiconductor It is noted that for the functionality disclosed herein, the access controller 102 plays the leading role and will be described in more detail below, noting again that the tasks may be separated into separate chips in other examples. When reference is made to a 'configuration' of the access controller 102 or the access controller 102 being 'configured' to perform a certain step, this is to be understood to relate to program code that is stored on non-volatile memory in the DSD 100 on program memory (not shown for clarity) and executed by the access controller 102.

In other examples, some or all steps disclosed herein may be performed by hardware circuitry without program code. In particular, encryption primitives may be implemented by dedicated hardware circuitry for performance and security reasons. For example, commands that are particularly computationally demanding, such as elliptic curve multiplication or exponentiation, may be implemented by an Arithmetic Logic Unit (ALU) specifically designed for this calculation, such that the calculation can be performed in a single or a smaller number of processor cycles compared to using a sequential program in a general purpose microcontroller. It is further noted that the chips included in DSD 100 are microcontrollers, which means in this context that they do not run under an operating system that provides a hardware abstraction layer but the program code acts directly on the hardware circuit. While elliptic curve cryptography is used herein as examples for reasons of computational efficiency and security, it is noted that other public-key cryptosystems, such as the Rivest-Shamir-Adelman (RSA) cryptosystem, could equally be used.

Returning back to FIG. 1, there are a number of devices in addition to host computer system 104 that are external to the DSD 100 and that act in the process of unlocking the DSD 100 and providing a key to the cryptography engine 106 so that, ultimately, decrypted data in plain text can be provided to host computer system 104.

In particular, there is a first manager device 110, which is a mobile phone in most examples. Installed on the manager device 110 is an application (app') to perform the following steps. In this way, the following steps can be implemented in software by the manufacturer of the DSD 100 and distributed to the manager device 110 through a commonly accessible app store, such as Apple's App Store or Google Play. The app installed on manager device 110 performs steps to take ownership of the DSD 100 at which point all data on the DSD 100 is erased or otherwise made inaccessible. For example, data may be crypto-erased by securely deleting all cryptographic keys stored on DSD 100.

For simplicity of presentation, this disclosure describes steps as simply being performed by manager device 110 if they are implemented by the app. The manager device 110 sets up the DSD 100, which means the various different keys are generated to support the process disclosed herein. Manager device 110 registers a user device 111 with the DSD, so that the user device 111 is then referred to as the "authorized device" 111. In most examples, the authorized device 111 is also a mobile phone with an app installed that implements the steps described as being performed by the authorized device 111. However, other types of devices can be used as authorized devices, which will be explained below in relation to beacons and key fobs.

Use Cases

There are three main use cases managed by the access controller 102 in conjunction with the manager device 110 and the authorized device 111. First, the manager device 110 registers a user device 111 once, with the data storage device 100 (specifically, the access controller 102), as one of possibly multiple authorized devices. This step ("registration" or "pre-authorization") would typically be performed while the DSD 100 is in possession of the manager who is operating the manager device 110 (and, therefore, while the DSD 100 and the manager device 110 are in proximity to each other) and before DSD 100 is provided to a user. Second, the authorized device 111, on first connection to DSD 100 (specifically, access controller 102), re-enrolls once to complete the generation of the involved keys. This step ("re-enrolment") would typically be performed upon delivery of the DSD 100 to the user. Third, the authorized device 111 subsequently connects to the DSD 100 (specifically, the access controller 102) to unlock the DSD 100. This third step ("unlock") can occur multiple times and would typically be performed each time a user of the authorized device 111 wishes to access user content data after powering up the data storage device 100, such as by connecting it to a USB or other power source.

Taking Ownership

The first step in using DSD 100 after purchase, unpacking and power-up is to install the app on manager device 110 and register a device as the manager device 110. For this process, the manager device 110 obtains a unique identifier of the DSD from the DSD. This unique identifier is referred to as the identity key (IDK). In the example illustrated in FIG. 1, the identity key is encoded in a quick response (QR) code 112 which is affixed to an external surface of the DSD 100. The app installed on manager device 110 has access to a camera and has a software module that extracts the encoded information from an image of the QR code 112. The manager device 110 captures an image of the QR code 112 using the camera, and decodes the identity key of DSD 100 from the QR code. In one example, the QR code encodes a Uniform Resource Locator (URL). In that case, a generic app can capture the QR code, which then automatically directs the phone to an application store where the app can be downloaded. The URL also includes the identity key so that the app can decode that identifier once the app is installed.

In another example, manager device 110 may read another tag or NFC chip affixed or integrated with DSD 100 to obtain the identity key. Using that identity key, the manager device 110 can then initiate a communication, such as wirelessly (e.g., over Bluetooth), with the DSD 100 and in particular, with the access controller 102.

Recovery Key

Upon taking ownership of the DSD 100, the access controller 102 generates a recovery key and provides the recovery key to the manager device 110. The recovery key can then be stored on a secure storage 113 or printed and locked away. Ultimately, the recovery key can be used by a backup manager device 114 to assume the manager role that the manager device 110 previously had.

Registration of Authorized Device

Once the DSD 100 is initially configured during the take ownership process, manager device 110 registers the authorized device 111. Typically, there may be multiple authorized devices registered with a single DSD 100, so manager device 110 registers the authorized device as one of multiple authorized devices. More particularly, access controller 102 receives from the manager device 110 a public key associated with a private key stored on user device 111. The manager device 110 itself may have received the public key from the user device 111 via email, by scanning a QR code displayed on the user device 111 or any other way. At this point in time, device 111 is not yet authorized and therefore, simply referred to as "user device 111". Once user device 111 is authorized, it is referred to as "authorized device 111". Access controller 102 creates authorization data that indicates that user device 111 is an authorized device (as described below) and stores the authorization data associated with the public key on the configuration memory 115 to register the user device 111 as one of the multiple authorized devices. This means keys and other data associated with authorized device 111 are created and stored as described below. A user can then use the authorized device 111 to unlock the DSD 100 simply by bringing the authorized device 111 into wireless communication range, such as within Bluetooth range. Again, the steps performed by authorized device 111 are encoded in an app installed on authorized device 111. Depending on configuration parameters, the user may be required to unlock authorized device 111 before DSD 100 can be unlocked.

More particularly, access controller 102 has access to a non-volatile configuration data store, such as configuration memory 115, which may be a flash memory that is external to the access controller 102 (but may equally be integrated into access controller 102). Configuration memory 115 may also store the program code that implements the steps described herein as being executed by access controller 102. It is noted that some examples herein are configured under the assumption that an attacker can readily unsolder and read out the content of the configuration memory 115 but should not be able to decrypt the user content data with that information. That is, in those examples, no keys are stored persistently in plain text on configuration memory 115 or elsewhere in DSD 100 on non-volatile memory.

Once the cryptographic keys are available in plain text, they are stored only in volatile memory (not shown). This means that a power-down of the DSD 100 erases all cryptographic keys stored in plain text. Additional circuitry may be provided to reset all remaining charges on power-down, power-up or external reset, so that it is physically impossible in practice to recover any information from volatile memory. In many cases, power-down and erasure of all volatile memory occurs as a result of the user disconnecting the USB cable from the host computer system 104. In other examples, a secondary power supply is used which needs to be disconnected to power down the DSD 100 to delete the volatile memory.

Challenge-Response

Configuration memory 115 has stored thereon data that is specific for the registered authorized device 111. This data may be referred to as an identifier of the authorized device 111 or as a public key associated with a corresponding private key stored on the authorized device 111. The public key may be a "transport public key" (TPK) and is generated by the authorized device 111 on first launch of the app by executing an elliptic curve cryptography (ECC) primitive ECC-Pub({transport private key}). (Recall that while elliptic curve cryptography is used herein as examples for reasons of computational efficiency and security, it is noted that other cryptographic techniques could equally be used.) The corresponding private key is stored on authorized device 111. The access controller 102 is configured to use the identifier (e.g., transport public key) or generate and store a further public key, to generate a challenge for the authorized device 111. It is noted here that the challenge is unique in the sense that each challenge is different, so that a subsequent challenge is different from any previous challenges. As described below, this is achieved by multiplying the stored data by a random blinding factor. Then, the access controller 102 sends the challenge to the authorized device 111 over a communication channel that is different from the data path. For example, the data path may include a wire-based USB connection while the communication channel between the access controller 102 and the authorized device 111 is a wireless (e.g., Bluetooth) connection.

In one example, a re-enrolment process takes place responsive to the authorized device connecting with the DSD 100 for the first time after the authorization data was created and stored on configuration memory 115 associated with the transport public key of the authorized device 111 received from the manager device 110. During the re-enrolment process, DSD 100 updates the authorization data and, as set out below, requests the authorized device 111 to generate an unlocking public key (and a corresponding unlocking private key). The authorized device 111 then provides the unlocking public key to the access controller 102. The access controller 102 stores the unlocking public key in field 212b, thus overwriting the transport public key 212a.

Accordingly, following the re-enrolment process, the authorized device 111 stores two private keys, namely the transport private key and the unlocking private key. These two private keys (transport private key and unlocking private key) can be stored separately on the authorized device 111, and each of the two private keys can have different access policies associated with that key. For example, the transport private key may be accessible at any time, even if the authorized device 111 is locked (e.g., by a screen lock or time out), so as to allow continuous communication between authorized device 111 and DSD 100. To unlock DSD 100, however, the access policy of the unlocking private key may require that the user unlocks authorized device 111, enters a personal identification number (PIN), provides biometric or other authentication.

The use of the unlocking private key in association with a different access policy. This way, DSD 100 cannot be unlocked by a stolen authorized device. Since unlocking DSD 100 is performed only once while DSD 100 is powered, the increased security does not significantly reduce user convenience.

The authorized device 111 can calculate a response to the challenge that cannot be calculated by any other device that is not registered with the DSD. More specifically, the correct response cannot be calculated by a device that does not have access to data that corresponds to the identifier of the authorized device 111 stored on configuration memory 115. For example, authorized device 111 uses the stored unlocking private key that is associated with the corresponding unlocking public key stored on configuration memory 115, to calculate the response to the challenge.

The access controller 102 receives the response to the challenge from the authorized device 111 over the communication channel. It is noted here that if the access controller 102 simply validates the response to the challenge and upon success, reads the cryptographic key from configuration memory 115, the cryptographic key would be stored in plain text, which is undesirable since this would enable an attacker to disassemble the DSD 100 and read the key from configuration memory 115 to access the user content data stored on storage medium 105.

Calculate Key

So, instead, access controller 102 calculates the cryptographic key based at least partly on the response from the authorized device 111. This means the cryptographic key is not a pure function of the response but involves other values as described in more detail below. In summary, the cryptographic key is stored in encrypted form on configuration memory 115 and the response, which is based on the private key stored on the authorized device, enables the calculation of the secret that decrypts the cryptographic key.

Throughout this disclosure, reference may be made to 'wrapping' of keys, which simply means that the key is encrypted by another key (i.e., by the "secret"). In many cases of 'wrapping' the encryption is symmetric such that a single secret (key) exists that can decrypt the encrypted key (without a public key associated with the secret). In one example, symmetric encryption uses the Advanced Encryption Standard (AES) primitive.

Finally, access controller 102 provides the cryptographic key to the cryptography engine 106 (via data port 103 in this example) to decrypt the encrypted user content data stored on the storage medium 105 of the DSD 100. As mentioned above, once the access controller 102 has calculated the cryptographic key, the access controller 102 provides the cryptographic key to the data port 103 in plain text and the data port 103 issues the SECURITY SET PASSWORD command to the cryptography engine 106 including the cryptographic key.

It is noted that where reference is made to 'unlocking' the device, this can refer to the entire process described above including the challenge, the response to the challenge and sending of the cryptographic key to the cryptography engine 106 to allow plain text read commands issued by the host computer system. In other examples, the challenge and the response to the challenge are considered as being part of a separate 'connect' step. During the following 'unlocking' step the access controller 102 then sends the cryptographic key to the data port 103 to allow access to the user content data.

It is noted, as an aside, that it may be possible for an attacker to eavesdrop on the key transmission from the access controller 102 to the data port 103 and then to the cryptography engine 106. However, the transmission of the key is not over a public network, so this eavesdropping would require gaining access to and disassembling the unlocked DSD without removing power from the DSD 100. This scenario may be discarded as a threat since in this scenario the user content data is available anyway on host computer system 104. In other words, while the DSD 100 is connected and unlocked, data is available to the rightful user and the attacker. But once the user disconnects the DSD from host computer system 104, this eavesdrop attack is not possible anymore. Therefore, this attack is not further considered.

For completeness it is noted that once the cryptography engine 106 has received the cryptographic key, the host computer system 104 can issue ordinary READ SEGMENT commands and transparently access the encrypted data without any perceivable difference to accessing an unencrypted device. This is particularly the case where the cryptography engine has hardware cryptography modules to enable encryption and decryption at or above the read and write speed of the storage medium 105 and/or the data port 103. However, the user can disconnect the DSD 100 to lock it. This way, the DSD 100 can be carried by the user through insecure locations where the DSD 100 can be lost or stolen, but it is very difficult for another person to decrypt the encrypted user content data stored on storage medium 105. If the user maintains possession of the DSD, the user can connect it to a second host computer system 116, conveniently unlock the DSD 100 with his authorized device 111 (e.g., phone) and readily access the encrypted user content data stored on the storage medium 105.

For user convenience, the data port 103 can be configured such that if the DSD is locked, it registers with host computer system 104 as a mass data storage device with storage medium not present, similar to an SSD card reader with no card inserted. Once the authorized device 111 is connected to DSD 100 and the DSD 100 is unlocked, data port 103 switches to storage medium present, similar to a card reader that had an SSD card inserted. Such a configuration would avoid any warnings from being generated by the operating system of the host computer system 104 about the data not being accessible or access being denied. Instead, all user interaction would be performed by the app installed on the authorized device, which is fully controlled by the manufacturer of the DSD, so user experience can be optimized. As shown in FIG. 1, there may be further mobile phones acting as authorized devices 117 and 118.

Beacons and Key Fobs

Considering FIG. 1 again, it can be seen that there are further devices, such as beacons 120 and key fob 121. These devices can also be considered as "authorized devices" since they can operate essentially the same as the authorized device 111. Before initial registration by the manager device 110, these devices are referred to as "device to be authorized". When reference is made to a "user device" herein (mainly describing mobile phone 111 before initial registration), this also applies to the beacons 120 and key fob 121 except when noted otherwise, such as in cases where user input is required. Beacons 120 and key fob 121 also have their own private key stored securely so that they can respond to a challenge that is specific for one beacon or key fob. However, since the beacons 120 and key fob 121 have no user input, the initiation of communication may be slightly different. More particularly, beacon 120 and key fob 121 may periodically send advertisements to broadcast their existence and the DSD 100 then initiates the communication with beacon 120 and/or key fob 121, which prompts them to send their transport public key. This is in contrast to the authorized device 111, which sends the transport public key to the DSD 100 to initiate the communication.

In further examples, beacons 120 are in a de-activated state when they are powered up and need to be activated by a manager device 110 or an authorized device 111. This activation may follow a similar process as unlocking DSD 100. That is, manager device 110 or authorized device 111 or both are registered with each beacon 120 with their transport public keys and respond to a challenge as described herein. Thus, a device may be registered as a manager device or an authorized device with one of the beacons 102 and/or key fob 121 without being registered with the DSD 100 itself. If the response to the challenge is valid, beacons 120 then unlock DSD 100. In yet a further example, beacons 120 are registered with each other, such that manager device 110 and/or authorized device 111 need to activate only one of the beacons 120 and the remaining beacons become activated automatically. In other words, the activation 'spreads' through the beacon network as long as the beacons are in range of each other.

It is noted that the only piece of information that the authorized devices 111, 117, 118, 120 and 121 provide to the manager device 110 to become registered is one public key for each device. In other words, each device provides its own public key corresponding to a private key that is securely stored on that device. Therefore, if an attacker intercepts the initial communication between one of the devices 111, 117, 118, 120 and 121 and the manager device 110, the only information that the attacker can obtain is the public key. As the name suggests, the public key is not secret and can be generally known. Therefore, the attacker has not gained any advantage. Further, the manager device 110 cannot use the public key to gain access to anything else related to the authorized devices. For example, the manager device cannot decrypt or unlock any other data storage devices with which the authorized device has been registered by other manager devices.

The access controller 102 receives the public keys of the authorized devices from the manager device 110 and generates authorization data. Access controller 102 stores the authorization data on configuration memory 115 waiting for the authorized device to connect for the first time. On the first connection, access controller 102 performs a challenge-response for the authorized device and upon success, updates the authorization data to indicate that the authorized device is now fully registered. This first connection process is referred to as "re-enrolment" herein and details of generating the authorization data and the re-enrolment are provided below.

Elliptic Curve Cryptography

In one example, the challenge generated by the DSD 100 and sent to the authorized device 111 is based on elliptic curve cryptography. This has the advantages of shorter keys, which leads to more efficient communication and storage. Further, a large number of phones currently on the market provide dedicated functionality of elliptic curve cryptography within a secure hardware module. The secure hardware module securely stores the user's private keys and performs cryptographic primitives within the secure hardware module without the key leaving the secure hardware module and being sent to a general purpose processor core where the key may be subject to an attack for unauthorized retrieval. In one embodiment, the secure hardware module includes a separate processor that executes its own microkernel, which is not directly accessible by the operating system or any programs running on the phone. The secure hardware module can also include non-volatile storage, which is used to store 256-bit elliptic curve private keys. In one embodiment, the secure hardware module is a Secure Enclave coprocessor that is available on some Apple devices.

Authorized Device Data Record

Figure 2A:
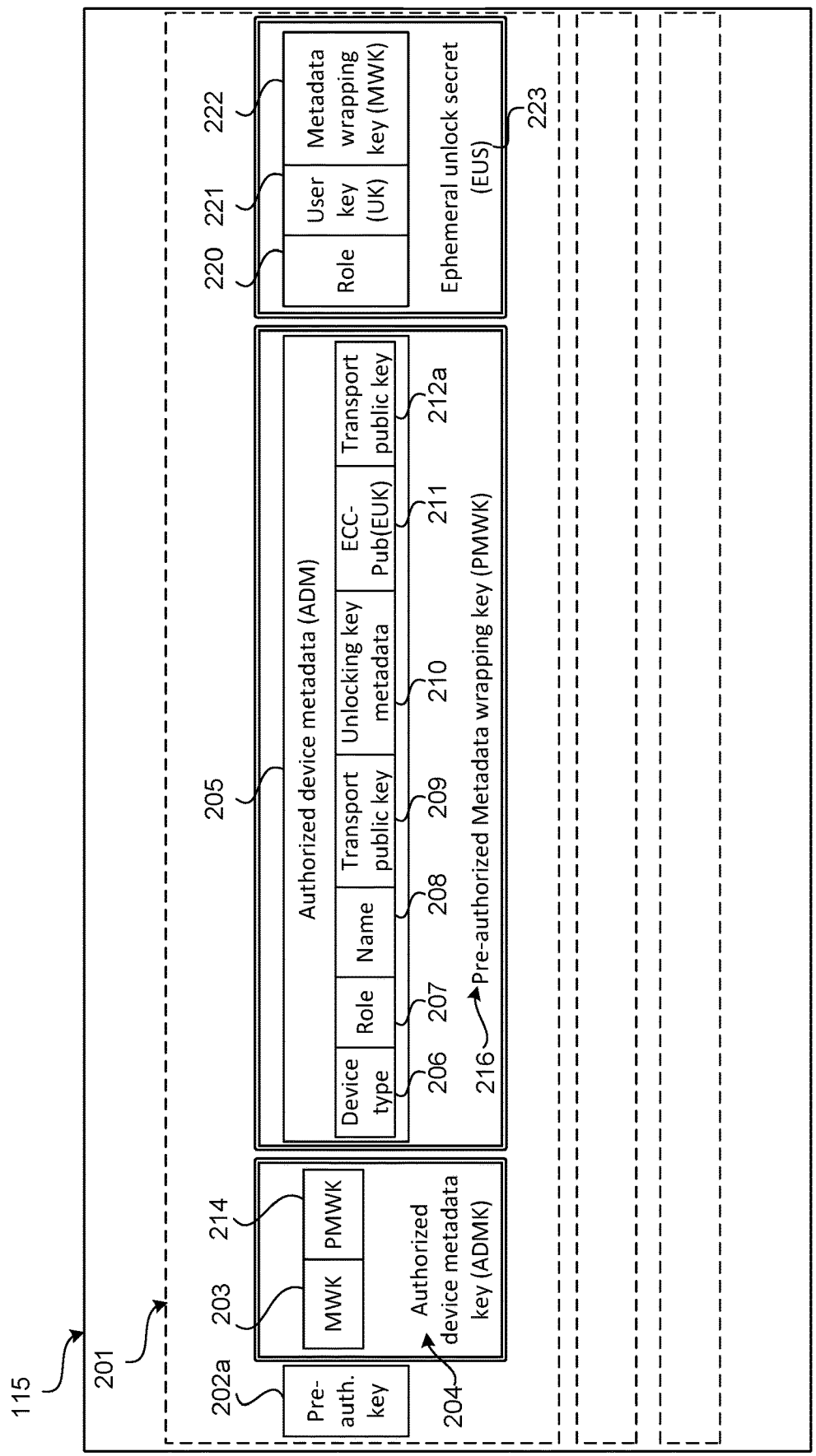
FIG. 2a illustrates a section of the configuration memory of the data storage device of FIG. 1 after registration of an authorized user device, according to an embodiment.
Figure 2B:
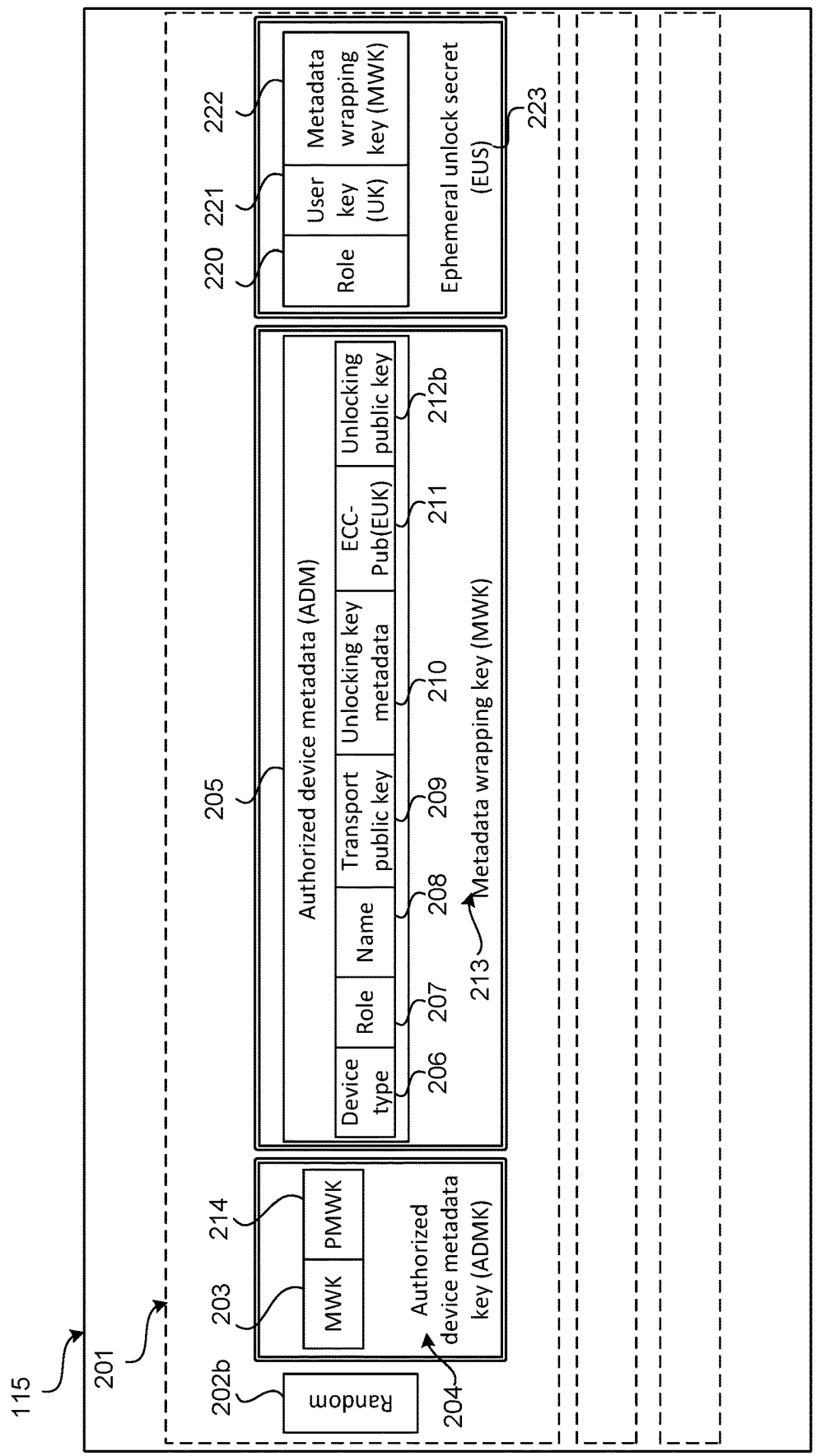
FIG. 2b illustrates a section of the configuration memory of the data storage device of FIG. 1 after re-enrolment of a user device, according to an embodiment.

FIGS. 2a and 2b illustrate a section of configuration memory 115, at different times, according to an embodiment. More specifically, FIGS. 2a and 2b both illustrate one record 201, in configuration memory 115, which is associated with one of multiple authorized devices and referred to herein as "authorization data". FIG. 2a illustrates record 201 prior to re-enrolment of the authorized device associated with record 201. FIG. 2b illustrates record 201 after the re-enrolment of the authorized device associated with record 201.

Further data records for further authorized devices are schematically indicated as empty dashed boxes but not considered in detail as they operate in a similar manner to record 201. In particular, each further data record comprises authorization data generated by the access controller 102 in response to receiving a public key of a user device from the manager device 110 and then updated during the first connection of the user device (then "authorized device"). For convenience, the data structure of configuration memory 115 is referred to as a 'table' comprising one or more 'records', where each record relates to one registered authorized device and each record has multiple fields. It is noted, however, that other data structures can be used, such as JavaScript Object Notation (JSON), Extensible Markup Language (XML), binary formats, etc. In one example, each entry has a fixed length and the table has a fixed number of rows (i.e., entries). Within this disclosure, a 'record' may also be known as a 'row' or 'entry'.

Record 201 comprises a field for a pre-authorization key 202a, which is used responsive to the authorized device 111 connecting to the DSD 100 for the first time. During this first connection, access controller 102 performs a number of steps that are referred to as "re-enrolment" as described below in more detail. The pre-authorization key 202a is generated from the identifier (e.g., the transport public key) of the authorized device 111. For example, access controller 102 may generate the pre-authorization key 202a by applying a key derivation function using the x-coordinate of the transport public key as an input parameter together with an authorized device slot key as salt value to the derivation function. The authorized device slot key may be a pseudo-random number (e.g., 16-bytes) stored on configuration memory 115 and can be used to encrypt data in authorized device certificates so that only the issuing DSD 100 can recover the information.

At that point, it can be said that the records stored on the configuration memory 115 are indexed by preauthorization key 202a based on an identifier of the authorized device (e.g., the transport public key). As described below with reference to FIG. 4, the index of record 201 may be stored in a certificate, as a slot number, during re-enrolment. Accordingly, during re-enrolment, the pre-authorization key 202a, which forms an authorization data record index, can be replaced by a random value 202b to make the configured DSD indistinguishable from a new device from the factory even with possession of the transport public key.

Record 201 further comprises a field for a first copy of a metadata wrapping key (MWK) 203 and a pre-authorization metadata wrapping key (PMWK) 214. Some fields in record 201 are encrypted which is indicated by double-lined boxes, where the single solid line boxes, inside the double-lined boxes, indicate the 'payload' such as the metadata wrapping key 203 and the pre-authorization metadata wrapping key 214. The corresponding encryption key, used to encrypt the payload, is noted at the bottom of the double-lined box. So, for example, metadata wrapping key 203 is encrypted by an authorized device metadata key (ADMK) 204. It should be noted that each encryption box may comprise an additional nonce that is concatenated with the payload data. This guarantees that the encrypted entry cannot be distinguished from random data even with the possession of the encrypted data, such as the transport public key of the authorized device.

Record 201 further comprises a field for authorized device metadata (ADM) 205, which is a concatenation of a device type 206 (e.g., recovery key, key fob, beacon, phone, computer, watch, etc.), a role of the device 207 (e.g., manager or user), a name of the device 208 (e.g., "John's phone"), a transport public key 209, unlocking key metadata 210 (e.g., key restrictions of whether fingerprint, pin or no unlock is required), an ephemeral public key 211, and an unlocking public key 212b. In one embodiment, the ephemeral public key 211 is an elliptic curve public key generated from a random ephemeral private key (EPK) using an Elliptic Curve Cryptography (ECC) primitive ECC-Pub(EUK). The ephemeral private key is not stored on configuration memory 115 or on the authorized device 111 but is discarded after creating the ephemeral public key. This means that the ephemeral private key is not stored on non-volatile memory but only on volatile memory. As a result, a power-down of the memory leads to complete and irrecoverable loss (e.g., destruction) of the ephemeral private key. The unlocking public key 212b corresponds to an unlocking private key stored on authorized device 111 and is generated by authorized device 111 and provided to the access controller 102 during re-enrolment.

The authorized device metadata (concatenated with a further nonce) is encrypted by the metadata wrapping key (MWK) 213 that is also stored in encrypted form at 203. The main purpose of storing the encrypted metadata wrapping key 203 in entry 201 is to allow a manager user, who has access to the authorized device metadata key 204, to access the encrypted authorized device metadata 205. If the metadata wrapping key was not accessible to the manager, the manager would not be able to retrieve from the DSD 100 any information about which authorized devices are currently registered. In one example, the authorized device metadata key 204 is a single key for all authorized devices and is stored encrypted by a manager key. The manager key may be a pseudo-random value (e.g., 32 bytes) and generated by access controller 102 responsive to storage medium 105 being erased. The manager key is encrypted and stored for each paired manager device 110/114.

Record 201 further comprises a field for a second copy of device's role 220 concatenated with a user key 221 and a second copy of the metadata wrapping key 222. It is noted that both role 207/220 and metadata wrapping key 203/222 are stored in two copies, which are identical but encrypted using different keys. The purpose of storing two copies of the role 207/220 is to enable the access controller 102 to verify the role during connection (responsive to the authorized device metadata being decrypted) as well as during unlocking (responsive to the user key 221 being decrypted). The purpose of storing the first copy of the metadata wrapping key 203 is to provide it to a manager device having access to the authorized device metadata key. The purpose of the second copy of the metadata wrapping key 222 is to provide it to a pre-authorized device during the re-enrolment step that occurs in response to first connection of the authorized device 111 to the DSD 100. The concatenated values 220, 221, 222 together are encrypted by an ephemeral unlock secret (EUS) 223 that is originally generated by a Diffie-Hellman method using the ephemeral private key corresponding to ephemeral public key 211 and the unlocking public key 212b. The ephemeral unlock secret 223 can be recovered using the ephemeral public key 211 and an associated unlocking private key stored on the authorized device 111 and corresponding to unlocking public key 212b. In other words, the ephemeral unlock secret 223 is generated during the re-enrolment step that occurs in response to the first connection of the authorized device 111 to the DSD 100. The ephemeral unlock secret 223 is generated by the access controller 102 using the ephemeral private key and the unlocking public key 212b. It is noted that the ephemeral private key itself is not stored but nevertheless, the ephemeral unlock secret 223 can be recovered as described above. This means, the user key 221 is decryptable based on the response from the authorized device. It is noted that the user key 221 is identical for all authorized devices and can be used to decrypt user content data. This does not necessarily mean that the user key itself decrypts the user content data. There may be further keys that the user key decrypts and the final key decrypts the user content data. The terms "using a key to decrypt user content data" and "enable decryption of the user content data" refer to indirect encryption via multiple keys in a chain. In contrast "the key decrypts the data" refers to direct decryption of the data with the key, such as modulo multiplication of the encrypted data by the key. Here, the user key 221 is used to decrypt the data indirectly and may be the starting point of a chain of keys that are decrypted sequentially until finally, the chain ends at the key that decrypts the user content data. While in most examples disclosed herein, the ephemeral unlock secret 223 decrypts the user key 221, it is also possible that the cryptographic key is derived from the response to the challenge in other ways. For example, the response to the challenge may directly be used as the cryptographic key that decrypts the user content data.

This allocation of keys and metadata enables a configuration where the entire configuration information about authorized devices, manager devices, and other aspects is stored on the DSD 100 itself. However, the authorized devices require a key stored on the respective authorized device to unlock the DSD 100. If an unregistered user without access to any keys wants to access the entire configuration of the device, such as retrieve a list of registered devices, the unregistered user would need only the recovery key to become registered as a manager device and gain access to the manager key. The DSD 100 can then provide the entire contents of configuration memory 115 to the new manager device using the manager key. Further, there can be two manager devices and both can register or remove authorized devices. The other manager device would be able to obtain configuration updates by synchronizing its own records with the data stored on configuration memory 115. In some examples, the DSD 100 is configured to erase records 201 of all authorized devices (but not delete the user content data or the user key 221, which may be stored as another copy in encrypted form on configuration memory 115 separate from entry 201 and other entries) if the recovery key is used to gain access but that is a policy decision.

Figure 3:
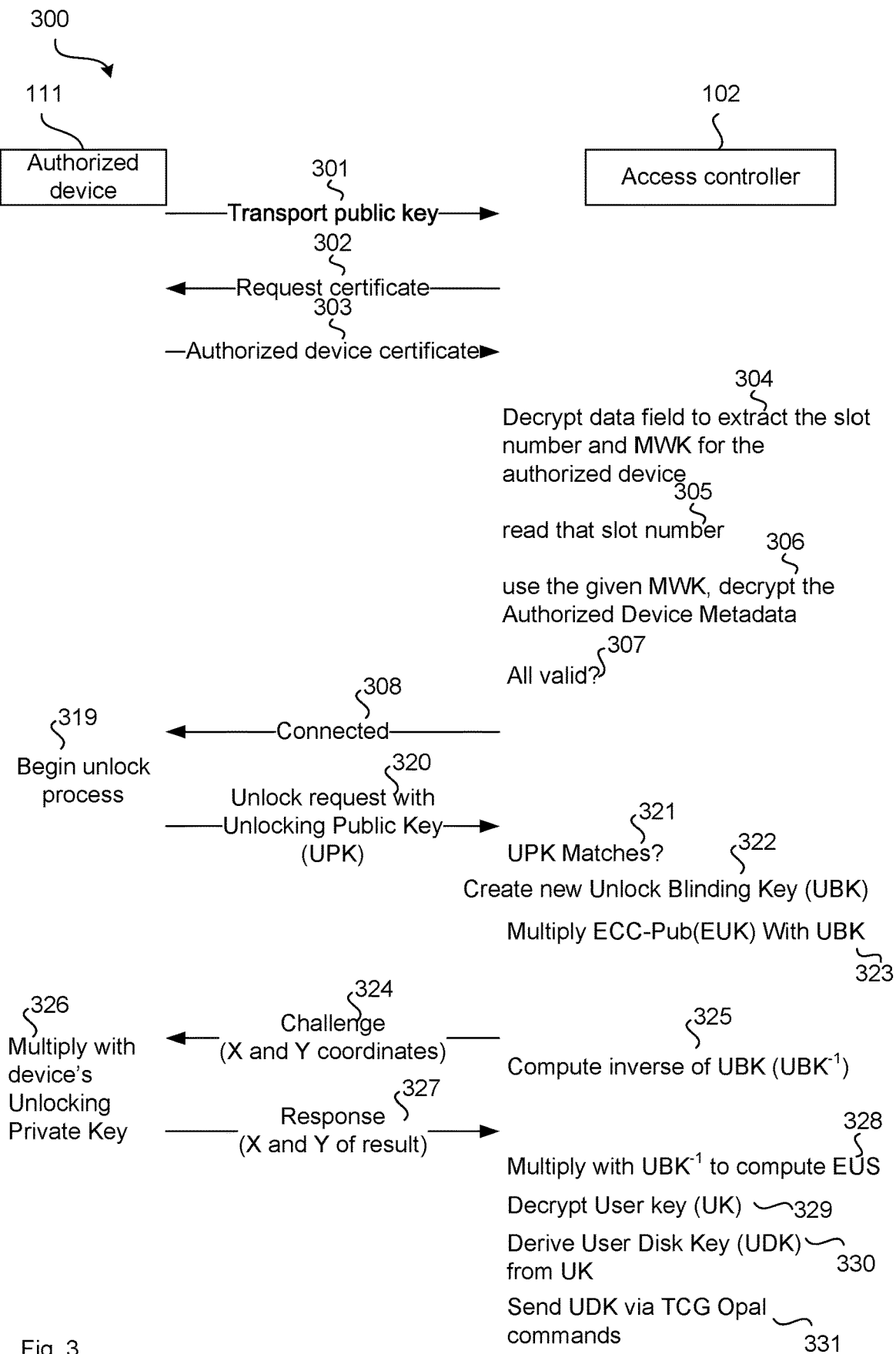
FIG. 3 illustrates a control flow between the authorized device and the access controller of FIG. 1, according to an embodiment.

FIG. 3 illustrates the control flow 300 between an authorized device 111, that has been re-enrolled with the DSD 100, and an access controller 102, according to an embodiment. First, the authorized device 111 initiates a connect method by sending 301 its transport public key. This step can be easily re-played by an attacker. Access controller 102 then replies 302 with a request for a certificate and in response to this request, authorized device 111 sends 303 a certificate previously obtained from the access controller 102 through the re-enrolment process.

Certificate

Figure 4:
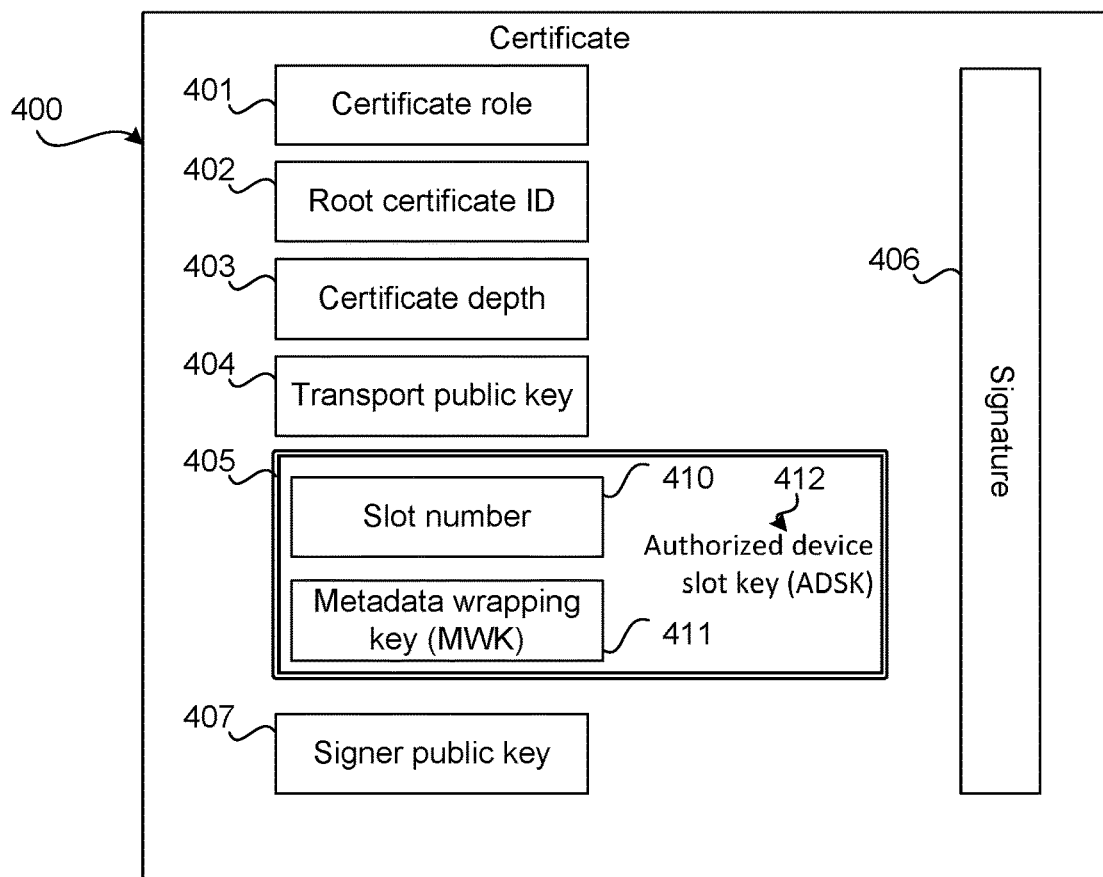
FIG. 4 illustrates a certificate issued by the data storage device and sent by the authorized device to the data storage device to unlock the data storage device, according to an embodiment.

FIG. 4 illustrates a certificate 400 issued by the data storage device 100 to the authorized device 111 during re-enrolment of the authorized device 111 to the data storage device 100, according to an embodiment. The authorized device 111 sends a copy of certificate 400 to the DSD 100 to unlock the DSD 100 during the unlocking step.

In this example, the certificate 400 comprises multiple type-length-value (TLV) fields, where the type value indicates the kind of field that is part of the certificate, length is the size of the value field (typically in bytes), and value is a variable-sized series of bytes which contains data for this part of the certificate.

Certificate 400 begins with a TLV atom that indicates the type of certificate that follows. This is referred to as the certificate role 401 and has a 2 byte value to indicate that this is an authorized device certificate.

Certificate 400 belongs to a certificate chain. Access controller 102 uses the chain to validate and authenticate certificate 400. To indicate which chain certificate 400 belongs to, certificate 400 has a 4 byte root certificate identifier (ID) 402. The certificate identifier of each certificate in the certificate chain is the same. Certificate identifiers that do not match indicate an invalid certificate. In one example, a root certificate identifier indicates whether the certificate chain is a production or a development certification chain. In other examples, other groups may be indicated by respective certificate identifiers.

Certificate 400 further comprises a 1 byte indicator of certificate depth 403. A certificate's depth is defined as its distance from the root certificate within its certificate chain. The root certificate is defined to have a depth of zero. As a given certificate chain is processed the depth fields are validated to ensure integrity of the chain.

Certificate 400 also comprises a 64 byte certificate transport public key 404 (e.g., according to the National Institute of Standards and Technology (NIST) P-256 elliptic curve). Each certificate is denoted/indexed via a transport public key. Each type of public key will have its own dedicated tag type. That is, the tag type will denote the cipher suite used to generate the transport public key, such as the P-256 cipher suite.

Certificate 400 further comprises a data field 405 (explained below) and is authenticated via a signature 406. Access controller 102 receives certificate 400 and validates the signature before trusting or using any of the certificate's contents. To enable signature validation, the 64 byte signer public key 407 is provided as part of the certificate. The signature 406 itself is 64 bytes in length and computed over all prior TLVs 401-405, 407 encountered within the certificate, regardless if they are recognized by the implementation or not. More particularly, the signature 406 is derived from a hash of the certificate data. The specific data that is signed is certificate dependent, but contains all TLVs used to represent the certificate, including TLVs that are not recognized. The key used to generate the signature is a logical identity key and is associated with signer public key 407.

Data field 405 comprises the slot number 410, which denotes the index of the record 201 within configuration memory 115. Data field 405 also comprises a further copy of the metadata wrapping key 411 (in addition to the two copies shown in FIG. 2a). The data field 405 is encrypted with the authorized device slot key (ADSK) 412, which is a 16 byte pseudo random value stored in configuration memory 115 and is used to encrypt data in authorized device certificates so that only the issuing DSD 100 can recover the information.

Unlocking the Data Storage Device

Returning to FIG. 3, if the authorized device 111 wishes to unlock the DSD 100, the authorized device 111 sends 303 the certificate 400, which includes the encrypted metadata wrapping key (MWK) 213/411 to access controller 102. The certificate 400 also includes the slot number 410, which is an index of the record 201 in configuration memory 115.

Access controller 102 uses the authorized device slot key stored in configuration memory 115 to decrypt 304 data field 405, and extract the slot number and metadata wrapping key. Access controller 102 then queries configuration memory 115 to read 305 the appropriate record 201 from configuration memory 115 and decrypts 306 the authorized device metadata 205 using the metadata wrapping key. This yields the ephemeral public key 211, which may also be referred to as an identifier of the authorized device because it uniquely identifies the authorized device since the ephemeral public key 211 is cryptographically associated with an unlocking private key stored only on authorized device 111. Access controller 102 may perform additional checks 307, such as validate that the transport public key 209 included in the authorized device metadata 205 matches the transport public key 404 presented in the certificate 400. Further, access controller 102 validates the role 401 against the valid set of values, and associates the role with the connection. This means that access controller 102 is aware of the current role (authorized device or manager device) during the duration of connection. For example, access controller 102 stores a parameter value on volatile memory that indicates the role 401 provided in the certificate. If any of the preceding checks fail, the authorized device is deemed to be revoked and an error to that effect is issued. Otherwise, the connection attempt succeeds and the access controller 102 sends 308 a connected confirmation message to the authorized device 111.

At this stage, the authorized device 111 is connected and the unlock process begins 319 by the authorized device 111 sending 320 an unlock request to access controller 102. The unlock request includes the unlocking public key associated with the private unlocking key stored on the authorized device's secure hardware module. Access controller 102 matches 321 the received unlocking public key against the unlocking public key 212b stored in the authorized device metadata record 205. Next, access controller 102 generates 322 a new blinding value (also referred to as unlock blinding key (UBK)), which essentially is an ephemeral private scalar and is generated randomly.

Access controller 102 then generates the challenge based on the identifier of the authorized device (e.g., ephemeral public key 211) multiplied by the unlock blinding key (UBK). More particularly, access controller 102 multiplies 323 the ephemeral public key 211 by the unlock blinding key, returning the full X and Y coordinates of the result, noting that this operation is performed on an elliptic curve. Access controller 102 then sends 324 the X and Y coordinates to the authorized device 111 as the challenge. It is noted here that this challenge is based on the identifier of the authorized device 111 because the ephemeral public key is one factor of the multiplication resulting in the challenge. It is further noted that for each unlock request (i.e., 320) a different unlock blinding key is generated to avoid man-in-the-middle attacks.

Further, access controller 102 computes 325 the inverse of the unlock blinding key ($UBK^{-1}$). The access controller 102 can compute the inverse of the unlock blinding key while waiting for a response from the authorized device 111.

The authorized device 111 calculates a response to the challenge by multiplying 326 the challenge with the unlocking private key, which is stored in the authorized device's secure hardware module and which corresponds to unlocking public key 212b stored on configuration memory 115. This may involve the execution of a cryptographic primitive that can be executed entirely within the secure hardware module within the authorized device 111. Authorized device 111 then sends back 327 the result in a response message. Access controller 102 multiplies 328 the returned result with the inverse of the unlock blinding key to compute the ephemeral unlock secret (EUS) 223.

In mathematical notation, P represents the ephemeral public key, and k represents the unlock blinding key created at step 322 in FIG. 3. Access controller 102 calculates 323 the product $k*P$ and sends 324 it to the authorized device 111. The authorized device 111 multiplies 326 the challenge with the unlocking private key j to calculate $j*k*P$ and returns 327 the result to access controller 102. The access controller 102 multiplies 238 this response with the inverse of the unlock blinding key $k^{-1}$ to calculate $$k^{-1}*j*k*P$$

which is equal to j*P due to commutative nature of elliptic curves (i.e., $k^{-1}*j*k*P=k*k^{-1}*j*P=j*P$).

Access controller 102 then uses j*P as the ephemeral unlock secret (i.e., key) to decrypt 329 user key 221. That is, access controller 102 uses the ephemeral unlock secret to decrypt the user key 221, stored on the DSD 100, which is encrypted with the ephemeral unlock secret. More particularly, access controller 102 decrypts 329 the user key, which then decrypts 330 a "user drive key", which is then, finally, sent 331 to cryptography engine 106 via TCG commands. That is, the user drive key may be generated by access controller 102 using a key derivation function based on the user key. The user drive key is the TCG credential used to unlock the DSD 100 and may be equated to the "cryptographic key" described herein. In the case of Opal, this is the User2 credential.

It is noted that the access controller generates the ephemeral unlock secret during the re-enrolment process by deriving a symmetric key from the result of an Elliptic Curve Diffie-Hellman process using the unlocking private key stored on the authorized device 111 and the unlocking public key 212b. The resulting key is used to encrypt the user key 221 but not stored in DSD 100. Instead, the access controller re-generates the ephemeral unlock secret 223 each time an authorized device requests to unlock the DSD 100, as described above.

In a further example, the unlocking private key j, in the equations above, can be replaced by a product of the unlocking private key with a value derived from a passphrase. The unlocking private key would still be stored in the secure hardware module of the authorized device but the unlocking private key alone would not be able to decrypt the user content data stored on the DSD 100. Instead, the user needs to enter the passphrase to calculate the response to the challenge and send 327 that response. This would simply replace j above with the product of j with the passphrase value. The DSD would be oblivious of that change because the ephemeral unlock secret 223 would be generated in the same way as above from the view of the access controller 102.

Registration

As set out above, there are three scenarios: First, the manager device 110 registers a user device 111 once as one of multiple authorized devices. Second, the authorized device 111, on first connection with the access controller 102, re-enrolls once to complete the generation of the involved keys. Third, the authorized device 111 subsequently connects with the access controller 102 to unlock the DSD 100. This third scenario can occur multiple times.

During the registration scenario, initiated by the manager device 110, the access controller 102 receives from the manager device 110 a public key, e.g. a transport public key, corresponding to a private key stored on the user device 111. In response, the access controller 102 creates authorization data, as illustrated by data record 201 in FIG. 2a.

Access controller 102 generates the pre-authorization key 202a that is essentially an index to locate the record 201. The pre-authorization key 202a is generated by a key generation function using the x coordinate of the received transport public key 209 and a salt value. The salt value may be an authorized device slot key, which may be a 16-bytes pseudo-random value generated during the "take ownership" process, stored on the configuration memory 115, and not shared with the authorized device. This way the salt can be different after each "factory reset", such as each time a manager device takes ownership of the DSD 100.

Creating the authorization data stored in record 201 further comprises generating the metadata wrapping key 222, such as by generating a 16-bytes pseudo-random value. Access controller 102 stores the metadata wrapping key in field 222. Further, access controller 102 generates the ephemeral unlock secret 223 and encrypts the role 220 (e.g., "authorized device"), user key 221 and the new metadata wrapping key 222 with the ephemeral unlock secret 223. Then access controller 102 generates an ephemeral public key 211 from the ephemeral unlock secret 223 and discards ephemeral unlock secret 223.

Re-Enrolment

Recall that during the registration scenario, initiated by the manager device 110, the access controller 102 creates authorization data, as illustrated in FIG. 2a. During the re-enrolment scenario, initiated by the authorized device's 111 first connect with the access controller 102 of the DSD 100, the access controller 102 alters record 201 so that the Authorized Device Metadata (ADM) 205 is encrypted by the metadata wrapping key 213/222, which is encrypted using the ephemeral unlock secret 223.

More particularly, when a pre-authorized device connects for the first time, the Authorized Device Metadata (ADM) 205 is wrapped with the pre-authorized metadata wrapping key 216 (see FIG. 2a). When the pre-authorized device connects, the access controller 102 performs the re-enrolment process. As part of the re-enrolment process, the access controller 102 uses the pre-authorized device's transport public key to complete a "logical unlock" of the data storage device. Once this is performed, the metadata wrapping key (MWK) 222 is available wrapped by the Ephemeral Unlock Secret (EUS) 223, and the access controller rewrites the record 201 using the Metadata Wrapping Key (MWK) to encrypt the authorized device metadata 205.

FIG. 2a depicts data record 201 prior to the re-enrolment of the authorized device 111. FIG. 2b depicts the state of the data record 201 after the access controller 102 has completed the re-enrolment process for authorised device 111, and the authorized device 111 is enabled to decrypt the encrypted user content data. Note that field 212a in FIG. 2a holds the transport public key, as received from the manager device 110; however, field 212b in FIG. 2b holds the unlocking public key, because prior to the re-enrolment step, the unlocking public key has not yet been generated.

Note also that, in contrast to FIG. 2b, the authorized device metadata 205 in FIG. 2a is not encrypted by the new metadata wrapping key, but by a pre-authorized metadata wrapping key 216/214, because the actual metadata wrapping key 222 is not yet available to the authorized device 111. The pre-authorized metadata wrapping key 214 may be identical to the pre-authorization key 202a at this stage or generated separately. It is noted that the pre-authorized metadata wrapping key 214, which now encrypts the authorized device metadata 205 can be generated only by the access controller 102 and not provided by the authorized device 111, because the authorized device 111 does not have access to the authorized device slot key that is used to generate the pre-authorized metadata wrapping key 214 from the transport public key 209.

The re-enrolment process is triggered by the authorized device 111 first connecting with the access controller 102, and the authorized device 111 sending its transport public key to access controller 102. Access controller 102 uses the transport public key and the stored authorized device slot key to generate the pre-authorization key 202a. Access controller 102 can then search for the pre-authorization key 202a in the configuration memory 115 to retrieve record 201. Access controller 102 can also use the pre-authorization key as the pre-authorization metadata wrapping key to decrypt the authorized device metadata 205. Re-enrolment may also be triggered by other events or periodically to ensure the unlocking public key 212b is not used for too long.

In response to receiving the transport public key 209 from the authorized device, the access controller 102 generates a challenge, using the ephemeral public key 211 and an unlock blinding key, and transmits 324 the challenge to the DSD 100. The DSD 100 responds to the challenge with a response 327. Access controller 102 then creates the ephemeral unlock secret 223 from the response. It is noted that only the authorized device 111 with the private key corresponding to transport public key 209 can create a valid response. This means that even if an attacker disassembles the configuration memory 115 and reads the authorized device slot key to generate the pre-authorization metadata wrapping key to decrypt the ephemeral public key 211, the attacker would still not be able to generate the ephemeral unlock secret 223.

Access controller 102 validates the response by checking that the response works as ephemeral unlock secret 223 and in response, updates the authorization data in record 201. More particularly, access controller 102 checks whether field 212b for the unlocking public key is identical to the transport public key 209. In response to determining that field 212b for the unlocking public key is identical to the transport public key 209, access controller 102 requests a new unlocking public key from authorized device 111 and stores the returned key as unlocking public key 212b.

Access controller further decrypts the metadata wrapping key 222 that was generated during registration by the manager device 110. At this stage, access controller 102 may re-generate the ephemeral unlock secret 223, encrypt role 220, user key 221, and metadata wrapping key 222, re-generate and store the ephemeral public key 211 and discard the ephemeral unlock secret 223. Finally, access controller encrypts the authorized device metadata 205 with the metadata wrapping key 222 and overwrites the pre-authorization key 202a with random bits 202b to make the configuration memory 115 indistinguishable from random data even with the possession of the transport public key and/or the unlocking public key. This concludes the update of the authorization data stored in record 201 and the re-enrolment process. As a result, the authorized device 111, as one of multiple authorized devices, is now allowed to decrypt the encrypted user content data through the unlocking steps set out above.

The registration and re-enrolment processes described above, involving the creating and update of authorization data stored in record 201, enables the registration of multiple authorized devices using only their public keys during the first step of registration by the manager device 110. In this way, no secret information needs to be shared that could potentially be intercepted and used for malicious unlocking of other devices of the user.

Re-Enrolment Method

Figure 5:
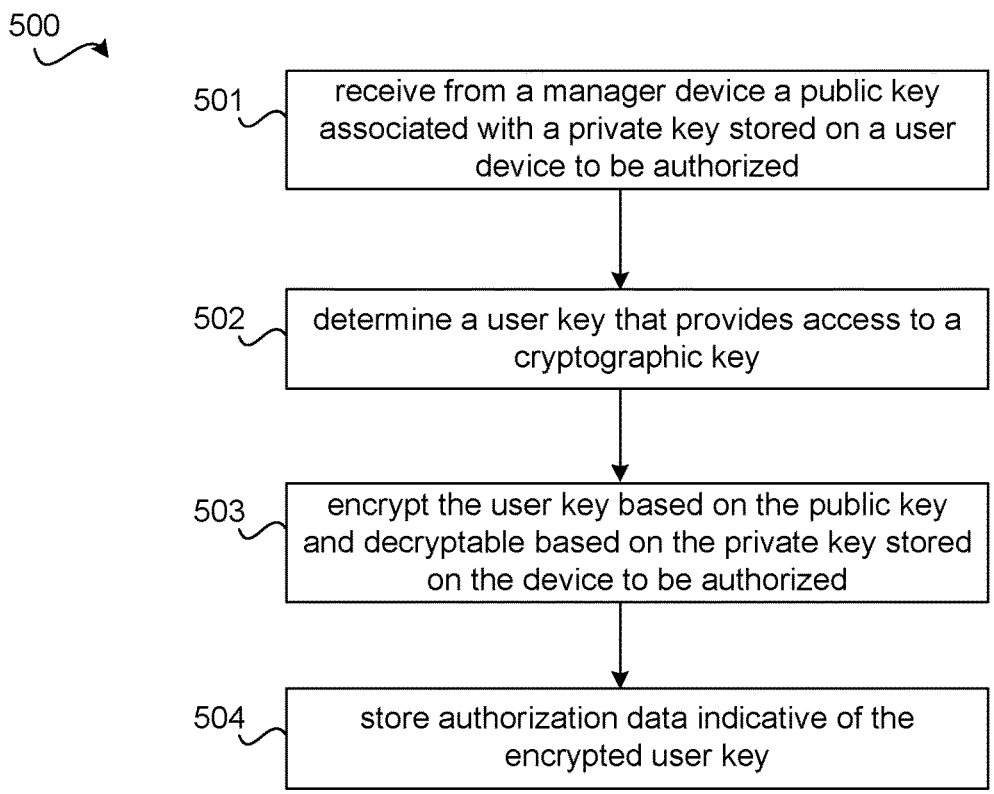
FIG. 5 illustrates a method for enrolment of a user device with a data storage device, according to an embodiment.

FIG. 5 illustrates a method 500 for enrolling a user device 111 with respect to a DSD 100, according to an embodiment. The method as shown in FIG. 5 illustrates what is described above as the registration or pre-authorization of a user device. Further steps that are not shown in FIG. 5 may follow, which may include the re-enrolment steps described above. The entire process including registration together with the re-enrolment may be referred to as 'enrolment'.

Method 500 commences by the DSD 100 (e.g., access controller 102) receiving 501 from a manager device 110 the transport public key 209. The transport public key 209 is associated with a transport private key stored on a user device 111 to be authorized. DSD 100 then determines 502 a user key 221 that provides access to the cryptographic key that is usable to decrypt the encrypted user content data, such as by decrypting the user drive key as described above. DSD 100 also encrypts 503 the user key 221 based on the transport public key 209, such as by generating ephemeral unlock secret 223 as a key to encrypt user key 221. In this way, the user key 221 is decryptable based on the transport private key stored on the device to be authorized 111.

Finally, DSD 100 stores 504, on the configuration memory 115, authorization data 201 indicative of the encrypted user key 221. This means that DSD 100 may store the encrypted user key 221 directly or wrapped again by one or more further keys or in any other form that enables retrieval or determination of the user key 221 based on the transport private key 209 (as stored on the device to be authorized 111), such as by performing the challenge-response method described herein.

Registering the Data Storage Device

The data port 103 registers, with the host computer system 104, as a block data storage device. For example, Universal Serial Bus (USB) devices provide information in the form of a USB device descriptor. The USB device descriptor contains relevant information about the device. Accordingly, in embodiments in which the data storage device is connected to a host computer system via a USB connection, the data storage device registers with the host computer system as a block data storage device by configuring its USB device descriptor to indicate that the data storage device is a block data storage device.

The USB device descriptor provides structured information regarding the USB device such as the class of device, protocols supported, type of device, manufacturer and other configuration parameters. An operating system of a host computer can obtain the USB device descriptor of the data storage device by sending various standard control requests (e.g., GET_DESCRIPTOR requests) to the data storage device. In response to receiving these requests, the data storage device provides the USB_DEVICE_DESCRIPTOR to the host computer system, thus registering the data storage device with the host computer system as a block data storage device. The host computer interprets the USB_DEVICE_DESCRIPTOR to determine the configuration and capabilities of the data storage device. The host computer system may then store information regarding the data storage device in the registers of the operating system of the host computer system.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A data storage device comprising:
a data path comprising:
a data port configured to transmit data between a host computer system and the data storage device;
a non-volatile storage medium configured to store encrypted user content data; and a cryptography engine connected between the data port and the storage medium, wherein the cryptography engine is configured to use a cryptographic key to decrypt the encrypted user content data stored on the storage medium in response to a request from the host computer system; and an access controller configured to:
receive, from a manager device, a public key, wherein:
the public key is associated with a private key stored on a device to be authorized;
the host computer system is a first device;
the manager device is a second device; and
the device to be authorized is a third device;
determine a user key that provides access to the cryptographic key;
encrypt, based on the public key, the user key, wherein the user key is decryptable based on the private key stored on the device to be authorized; and
store, in a non-volatile data store, device authorization data indicative of the encrypted user key.

2. The data storage device of claim 1, wherein the access controller is further configured to receive the public key, determine the user key, encrypt the user key, and store the device authorization data in response to the manager device connecting to the data storage device.

3. The data storage device of claim 2, wherein the access controller is further configured to, responsive to the manager device connecting to the data storage device, recover a manager key that enables determining the user key.

4. The data storage device of claim 3, wherein:
the manager device is registered with the data storage device based on manager authorization data;
the manager authorization data is stored in the data store; and
the manager authorization data indicates that the manager key is accessible based on a private key stored on the manager device.

5. The data storage device of claim 1, wherein the access controller is further configured to, in response to the device to be authorized connecting to the data storage device:
determine a challenge for the device to be authorized based on the device authorization data;
send the challenge to the device to be authorized;
receive a response calculated based on the private key stored on the device to be authorized;
encrypt at least part of the authorization data using a metadata wrapping key; and
provide the metadata wrapping key to the device to be authorized.

6. The data storage device of claim 5, wherein the challenge is based on the device authorization data accessible using the public key.

7. The data storage device of claim 6, wherein the device authorization data accessible using the public key is encrypted based on the public key and a private key stored in the data store.

8. The data storage device of claim 1, wherein the device authorization data comprises an index based on the public key for locating the device authorization data for the device to be authorized.

9. The data storage device of claim 8, wherein the access controller is further configured to replace the index with random data in response to sending the index to the device be authorized.

10. The data storage device of claim 1, wherein the access controller is further configured to:
generate a certificate; and
send the certificate to the device to be authorized.

11. The data storage device of claim 10, wherein:
the certificate comprises a metadata wrapping key configured to encrypt the device authorization data; and
the device authorization data is used to create a challenge.

12. The data storage device of claim 11, wherein the device authorization data indicates:
a transport public key for transporting data between the access controller and the device to be authorized; and
an unlocking public key for generating the challenge for that authorized device.

13. The data storage device of claim 1, wherein:
the device authorization data indicates a first public key and a second public key; and
the access controller is further configured to selectively update the device authorization data based on the first public key being identical to the second public key.

14. The data storage device of claim 1, wherein the access controller is further configured to store authorization data for multiple devices to be authorized and the cryptographic key is encrypted using an unlocking secret that is specific to each of the multiple devices to be authorized.

15. The data storage device of claim 14, wherein the access controller is further configured to calculate the unlocking secret based on a response from one of the multiple devices to authorized to a challenge generated based on the public key associated with the one of the multiple devices to be authorized.

16. The data storage device of claim 1, wherein the device authorization data comprises authorized device metadata encrypted by a pre-authorized metadata wrapping key that is derivable from the public key.

17. The data storage device of claim 16, wherein the pre-authorized metadata wrapping key is derivable from the public key via a key derivation function using a private key stored in the data store.

18. The data storage device of claim 17, wherein the pre-authorized metadata wrapping key is a symmetric key.

19. A method for enrolling a user device with respect to a data storage device configured for access from a host computer system, the method comprising:
receiving from a manager device a public key, wherein:
the public key is associated with a private key stored on the user device to be authorized;
the host computer system is a first device;
the manager device is a second device; and
the user device is a third device;
determining a user key that provides access to a cryptographic key usable to decrypt encrypted user content data stored on a storage medium of the data storage device;
encrypting, based on the public key, the user key, wherein the user key is decryptable based on the private key stored on the user device to be authorized; and
storing, in a non-volatile data store, authorization data indicative of the encrypted user key.

20. A data storage device comprising:
means for receiving from a manager device a public key, wherein:
the public key is associated with a private key stored on a user device to be authorized;
the data storage device is configured for access from a host computer system;
the host computer system is a first device;
the manager device is a second device; and
the user device is a third device;

means for determining a user key that provides access to a cryptographic key usable to decrypt encrypted user content data stored on a storage medium of the data storage device;

means for encrypting, based on the public key, the user key, wherein the user key is decryptable based on the private key stored on the device to be authorized; and means for storing, in a non-volatile data store, authorization data indicative of the encrypted user key.

* * * * *